United States Patent
Iellimo et al.

(10) Patent No.: US 11,117,742 B2
(45) Date of Patent: Sep. 14, 2021

(54) GLIDE-IN CART STORAGE SYSTEM

(71) Applicant: FRAZIER INDUSTRIAL COMPANY, Long Valley, NJ (US)

(72) Inventors: Domenick Iellimo, Forked River, NJ (US); Aaron Iellimo, Califon, NJ (US)

(73) Assignee: Frazier Industrial Company, Long Valley, NJ (US)

( * ) Notice: Subject to any disclaimer, the term of this patent is extended or adjusted under 35 U.S.C. 154(b) by 0 days.

(21) Appl. No.: 16/850,168

(22) Filed: Apr. 16, 2020

(65) Prior Publication Data

US 2020/0283227 A1 Sep. 10, 2020

Related U.S. Application Data

(63) Continuation of application No. 16/291,152, filed on Mar. 4, 2019.

(51) Int. Cl.
*A47F 5/00* (2006.01)
*B65G 1/02* (2006.01)
*B65D 19/42* (2006.01)
*B65G 1/06* (2006.01)

(52) U.S. Cl.
CPC .............. *B65G 1/023* (2013.01); *B65D 19/42* (2013.01); *B65G 1/026* (2013.01); *B65G 1/06* (2013.01)

(58) Field of Classification Search
CPC .......... B65G 1/023; B65G 1/026; B65G 1/06; B65D 19/42; E04C 2003/0452
See application file for complete search history.

(56) References Cited

U.S. PATENT DOCUMENTS

| | | | | |
|---|---|---|---|---|
| 421,820 | A | * 2/1890 | Davy | B65G 9/008 104/109 |
| 1,586,480 | A | * 5/1926 | Snyder | E01B 3/16 238/61 |
| 1,911,413 | A | * 5/1933 | Wait | E04C 3/06 52/837 |
| 2,102,995 | A | * 12/1937 | Coombs | A47B 63/02 414/268 |
| 2,836,469 | A | * 5/1958 | Yorinks | A47B 88/493 384/19 |
| 3,214,959 | A | * 11/1965 | Bowden | B25H 1/0007 72/483 |
| 4,341,313 | A | 7/1982 | Doring | |

(Continued)

FOREIGN PATENT DOCUMENTS

JP 06316968 A * 11/1994

*Primary Examiner* — Kimberley S Wright
(74) *Attorney, Agent, or Firm* — Dilworth & Barrese, LLP

(57) ABSTRACT

A pallet storage system and method are provided. A rack for storing pallets loaded with goods is constructed with a corresponding pair of left and right rails. Carts for supporting the pallets ride on those rails. The rails can have an I-beam shape cross section, include a lower horizontal wall, a vertical wall extending up from the lower horizontal wall and an upper horizontal wall at the top of the vertical wall. The lower and upper horizontal walls include an outer flange extending from the vertical wall in a sideways direction away from the corresponding other rail and an inner flange, extending sideways towards the corresponding other rail. The carts can nest, until loaded and the front of the carts can be flush at the front of the rack.

15 Claims, 4 Drawing Sheets

(56) References Cited

U.S. PATENT DOCUMENTS

| | | | | |
|---|---|---|---|---|
| 4,438,645 A | * | 3/1984 | Lutz | B21D 1/14 269/296 |
| 4,717,305 A | * | 1/1988 | Edwards | B65G 1/0457 198/375 |
| 4,773,546 A | * | 9/1988 | Konstant | B65G 1/026 211/151 |
| 4,949,852 A | | 8/1990 | Allen | |
| 4,955,489 A | | 9/1990 | Allen | |
| 4,982,851 A | | 1/1991 | Konstat | |
| 5,080,241 A | | 1/1992 | Konstat | |
| 5,131,606 A | * | 7/1992 | Nordstrom | B64D 9/003 244/118.1 |
| 5,137,159 A | | 8/1992 | Collins | |
| 5,180,069 A | * | 1/1993 | Krummell | B65G 1/026 211/151 |
| 5,184,738 A | | 2/1993 | Allen | |
| 5,203,464 A | | 4/1993 | Allen | |
| 5,312,004 A | | 5/1994 | Krummell | |
| 5,316,157 A | | 5/1994 | Konstat | |
| 5,328,038 A | | 7/1994 | Allen | |
| 5,348,169 A | | 9/1994 | Allen | |
| 5,396,748 A | * | 3/1995 | Rogers | E04B 9/127 403/346 |
| 5,419,444 A | | 5/1995 | Strom | |
| 5,567,103 A | * | 10/1996 | Konstant | B65G 1/08 193/39 |
| 5,595,040 A | * | 1/1997 | Chen | E04B 1/2403 52/167.1 |
| 5,595,311 A | | 1/1997 | Allen | |
| 5,901,524 A | * | 5/1999 | Wright | E04C 2/388 52/506.07 |
| 5,913,794 A | * | 6/1999 | Chen | E04B 1/2403 52/167.1 |
| 6,068,141 A | * | 5/2000 | Mulholland | B65G 1/026 211/151 |
| 6,092,677 A | | 7/2000 | Krummell | |
| 6,343,453 B1 | * | 2/2002 | Wright | E04C 3/14 52/837 |
| 6,364,215 B1 | * | 4/2002 | Andre | E01B 25/28 238/122 |
| 7,040,069 B2 | * | 5/2006 | Simmons | E04B 1/2403 52/644 |
| 10,710,801 B1 | * | 7/2020 | Iellimo | B65D 19/42 |
| 2005/0055970 A1 | * | 3/2005 | Simmons | E04C 3/06 52/837 |
| 2012/0125874 A1 | | 5/2012 | Krummell | |

\* cited by examiner

GLIDE-IN CART STORAGE SYSTEM

BACKGROUND

The present disclosure relates generally to storage rack systems for articles loaded onto the type of pallets that are typically adapted to be handled by fork lift trucks and, more particularly, to storage rack systems of the push-back type, wherein a pallet of goods is loaded on a cart and a second pallet of goods is used to push the first pallet on the cart from the front of the storage rack to the back of the rack, to make room for the second pallet of goods, and so on.

Storage systems are used in warehouses, department stores, cold storage areas and other storage facilities to store pallets loaded with different goods. Certain storage systems employ extensive multi-story storage rack systems, often called deep rack or high-density storage systems, to store large amounts of a variety of different products.

Push-back storage systems are known in the art. A two deep system has been in use since the late 1950's. Three-deep and four-deep systems are described in U.S. Pat. No. 4,955,489, incorporated herein by reference. U.S. Pat. No. 4,949,852, incorporated herein by reference, describes a three-deep and four-deep system having a double cart assembly, wherein a large cart rides on the tracks and a smaller cart is carried by and movably mounted on the larger cart. See also U.S. Pat. Nos. 4,341,313 and 4,773,546, also incorporated herein by reference. U.S. Pat. No. 5,328,038, incorporated by reference, describes a system for storing eight pallets or more in a single row.

Rack systems are typically formed with vertical columns, which support horizontal rails running lengthwise from the front of a row to the back of each row. The horizontal rails can have the structure of an I-beam, having a lower horizontal wall, a vertical wall extending up from the lower wall and an upper horizontal wall at the top of the vertical wall. The rails are typically parallel. The portion of the upper or lower horizontal wall that faces the corresponding rail of a storage row can be referred to as the inner horizontal walls and the horizontal walls that face away from the corresponding rail can be referred to as the outer horizontal walls. The wheels of the carts that support the pallets can ride on the upper surface of the inner or outer lower horizontal wall of the horizontal rails.

Carts for supporting pallets commonly have a rectangular upper support portion on which the pallet rests and four legs extending downward from the front and rear corners of the support portion. The lower ends of the legs each support a wheel. If a wheel faces outward, it should ride on the inside flange of the lower wall, inside of the vertical wall. If it faces inward, it should ride on the outer flange, outside of the vertical wall. The distance between the upper surface of the support portion of the cart and the wheel determines the height the cart rides above the horizontal rail.

A crossbar typically extends sideways between the vertical columns, across the front of a pallet storage row, in front of the left horizontal rail and the right horizontal rail (left and right are from the perspective of looking into the row). This crossbar blocks the cart wheels from rolling out of the row. It also blocks access to the upper surfaces of the lower walls of the horizontal rails when it is desired to load a cart onto the row. Therefore, there was no easy way to mount the pallet cart wheels on the lower wall of the horizontal rails.

In order to provide access for the wheels, a pair of cut-out notches or slots is commonly formed in the inner and/or outer flange of the upper horizontal wall of the left or right horizontal rail. These notches are spaced a uniform distance from each other to match the wheel spacing between the front and rear wheels of a pallet cart. Therefore, the front to back wheel spacing of all the carts is often standardized to match the standardized spacing of the notches.

To install the carts on the rack, the side of the cart facing the notches is raised to tilt the cart sideways. A front/rear pair of wheels are placed on the upper surface of the lower wall of the rail without the cut-out slots. The front/rear pair of wheels on the other side of the cart are then lowered through the pair of slots, onto the upper surface of the lower wall. At this point, the cart is flat, with all four wheels on the upper surface of the lower wall.

The carts are often approximately 100 pounds in weight. It has therefore been difficult, especially as racks have increased in height, to fit the wheels on one side of the cart into the un-notched rails, then slide the wheels on the other side into the notches.

Other difficulties exist. In order to nest the carts, the front and rear wheels ride on opposite sides of the vertical wall. A rear cart, with inwardly facing front wheels on legs on the outside of the rail can slide over a front cart with its rear wheels facing outward on legs on the inside of the left and right rails. That way, a rear cart can slide over a front cart, until the front of the front legs of the rear cart contact the rear of the front legs of the front cart. Each successive cart became recessed from the previous cart, based on the width of the leg holding the uniformly spaced cart wheels. Therefore, in a multi-cart system, the rear-most (upper) cart can become undesirably recessed from the front of the rack.

These and other problems have persisted for many years without satisfactory solution. Accordingly, a more satisfactory structure, system and method are needed to overcome drawbacks and deficiencies in the prior art.

SUMMARY

Generally speaking, in accordance with the invention, a pallet storage system and method is provided, in which a rack for storing pallets loaded with goods is constructed with a corresponding pair of left and right parallel horizontal rails. Carts for supporting the pallets ride on those rails. The left and right rails extend from the front of the rack to the rear of the rack in a storage bay row. The rails can have an I-beam shape cross section, include a lower horizontal wall, a vertical wall extending up from the lower horizontal wall and an upper horizontal wall at the top of the vertical wall. The lower and upper horizontal walls include an outer flange extending from the vertical wall in a sideways direction away from the corresponding other rail of the storage row and an inner flange, extending sideways towards the corresponding other rail of the storage row.

Both the outer flange and the inner flange of both the left and right rails of a pair of rails include cut-out notches (slots), spaced back from the front of the rack. The notches are sized to receive the wheels from a cart, such wheels commonly 2-3 inches in diameter, and to permit those wheels and the legs supporting the wheels to extend through the notches and rest on the upper surface of the lower wall of the rail. The notches on the inner flange can be aligned with the notches on the outer flange or spaced apart from those notches. The notches on the inner flange on the right rail should be spaced the same distance from the front of the rails as the notches on the inner flange on the left rail. Similarly, the notches on the outer flange on the right rail should be spaced the same distance from the front of the rails as the notches on the outer flange on the left rail.

Carts for supporting pallets in accordance with the invention include a pallet supporting portion with an upper surface, which can have the general size and shape of a pallet. The carts can have side beams extending from front to back. The carts can have four legs descending from the side beams of the pallet supporting portion. Each leg includes a wheel, for riding on the inside or outside flange of the upper surface of the lower horizontal wall of the rail. The legs can be positioned so that a wheel rides on the inner flange or outer flange of the lower wall. Inwardly facing wheels can ride on the outer flange and the respective leg can be attached on the outside of the horizontal beam and positioned outside the rail. Outwardly facing wheels can ride on the inner flange and the respective leg can be attached inside the beam and positioned inside the rail.

When the distal (rear) leg of a first cart is inside the inner flange and the proximal (front) leg of a second cart is outside the outer flange, and the legs of the second cart are sufficiently longer than the legs of the first cart, the second cart can ride higher than the first cart and nest over the first cart. Accordingly, the second cart can be slid over the first cart.

If the rear wheels of the second cart are positioned to ride on the inner flange and the front wheels of third cart are positioned to ride on the outer flange, the third cart can nest over the second and first carts. In each case, the front of the front leg of the upper cart will contact the rear of the front leg of the lower cart. However, by spacing the front legs of each cart rearward along the side beam, with respect to the placement of the front leg of a lower upper cart, the fronts of all of the carts can be flush with each other and with the front of the rack when the carts are nested in the frontmost position. Similarly, if the rear wheels are both on the inner flange, the front of the rear legs of the higher cart can contact the rear of the rear legs of the lower cart. By positioning the rear leg of the lower cart forward, with respect to the location of the rear leg of the upper cart on the respective beams, the fronts of both carts can be made flush.

It is also preferred to incline the rails, so that the carts naturally roll to the front of the rack. For example, the rails can rise about 1/16 to 8/16 inch for each foot, preferably 3/16 to 7/16 inch, most preferably about 5/16 inch per foot. The cut-outs should be sized to accept the legs and wheels on the carts. Preferably, the notches are about 2 to 4 inches wide, more preferably 2.5 to 3.5 inches, most preferably about 3 inches wide. The notches preferably extend from the inside or outside edge of the upper wall to the vertical wall. The notches should be located less than 48 inches from the front of the rails, preferably about 16 to 36 inches from the front end of the rails, more preferably 18 to 24 inches, most preferably about 21 inches. The notches on the inner flange of the left rail should be the same distance from the front end of the rails as the notches on the inner flange of the right rail. The notches on the outer flange of the left rail should be the same distance from the front end of the rails as the notches on the outer flange of the right rail. The notches on the inner and outer flanges can be the same distance from the front end of the rails, such that they are back-to-back or offset.

To install a cart on a rack system in accordance with an embodiment of the invention, the rear wheels of what will be the highest (rearmost when loaded) cart are placed on the upper surface of the upper horizontal wall of the corresponding left and right pair of rails. The cart is then pushed back in the rack until the wheels (and legs) fall through the notches and the wheels engage the upper surface of the lower horizontal wall. The front wheels are then placed on the upper horizontal wall and the cart is pushed back until those wheels fall through the notches. This sequence is repeated with the next highest (next rearmost) cart, until all of the carts are loaded on the rails of the rack.

Other objects, advantages and embodiments of the invention will be apparent from the specification and the drawings and the scope of the invention will be indicated in the claims.

BRIEF DESCRIPTION OF THE DRAWINGS

Throughout the specification, like reference numerals will be used to indicate similar elements.

DETAILED DESCRIPTION OF THE PREFERRED EMBODIMENTS

The present disclosure may be understood more readily by reference to the following detailed description of the disclosure, taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
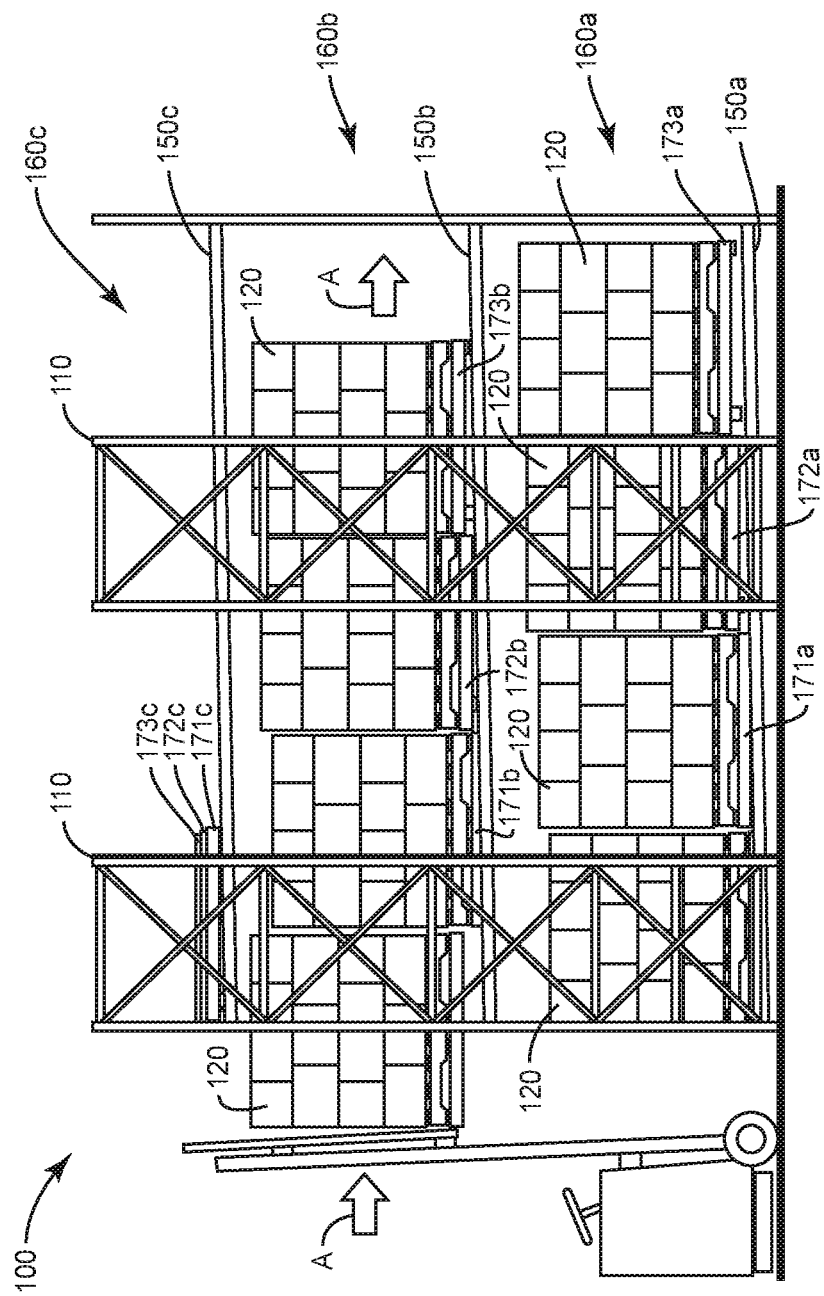
FIG. 1 is a side elevational view illustrating a storage rack system in accordance with a four-pallet deep (three cart) embodiment of the invention.

A glide-in pallet storage rack system, in accordance with a preferred embodiment of the invention, is shown generally in FIG. 1 as a rack system 100. Rack system 100 includes a set of vertical support structures 110, which support left and right sets of rails 150 (150a, 150b and 150c). Rails 150(a, b and c) are pitched, such that they rise 5/16 inch per foot. Other pitches are acceptable. Preferably, the rails are pitched at least 0.1, more preferably at least 0.25 inches per foot. Note that it can be dangerous if the rails are pitched too steeply. Thus, they should commonly be pitched less than about 0.5 inches per foot. Each set of left and right rails 150 forms a rack 160(a, b and c), which corresponds to a storage bay. Storage bays can include a pair of side-by-side racks 160.

Rack system 100 is a 4-pallet deep storage system. Therefore, it can fit four standard size pallets of goods in each rack 160. A standard pallet is typically about four feed long (front to back) and about 3.5 feet wide (side to side). Most pallets can hold up to about 3000 lbs. and at least 1000 lbs. It is generally preferred, especially for safety, for the front pallet to rest on the rails, and not on a cart. Therefore, 4-deep pallet storage system will typically include 3 carts.

Upper rails 150*c* have no pallets and can be loaded. Three carts, 171*c*, 172*c* and 173*c* are shown nested at the front of rails 150*c*. Lower rails 150*a* are shown loaded with four pallets of goods 120. Upper loaded pallet 120 rests on upper cart 173*a*. Third loaded pallet 120 rests on middle cart 172*a*. Second pallet 120 rests on first cart 171*a*. First pallet 120 rests directly on rails 150*a*.

The loading procedure is shown with respect to rails 150*b*. A first pallet 120 was loaded onto third cart 173*b*. Then, a second pallet 120 was used to push first pallet 120, on third cart 173*b* towards the back of the rack, until second cart 172*b* became uncovered. The second pallet was then placed on second cart 172*b*. A third pallet 120 was then used to push pallets 120 and carts 173*b* and 172*b* towards the back of rack 160*b*, until first cart 171*b* became uncovered. Then, third pallet 120 was placed on cart 171*b*. Finally, as is being shown in FIG. 1, with respect to second rails 150*b*, which contains carts 171*b*, 172*b* and 173*b*, respectively, a fourth pallet 120 is used to push all the pallets and carts towards the back of rack 160*b*. This fourth pallet is then placed directly on rails 150*b*. As depicted, all the pallets and carts are loaded in an insertion direction, depicted as an arrow A. Insertion direction A extends from the front to the rear of each rack 160 and defines the perspective of the left and right sides. After the fourth pallet is installed on rails 150*b*, rails 150*b* will be in the same condition as rails 150*a*.

Rails 150 are inclined upwards, as they progress from the front to the back of the rack. This way, as a pallet 120 is removed, the pallets remaining in a row will roll forward, to the front of the row. The front pallet is then taken off the cart and used to push the remaining carts back, to expose the rail. One or more carts can become nested under a more rearward cart until all the pallets are removed from the carts in a row.

Figure 2:
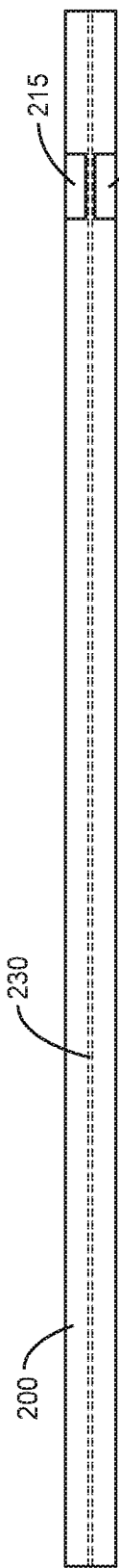
FIG. 2 is a top plan view of one rail of an embodiment of the invention.
Figure 3:
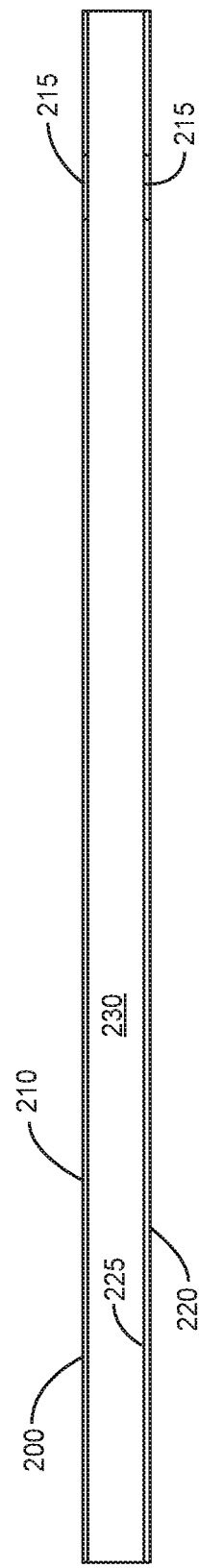
FIG. 3 is a side elevational view of the rail of FIG. 2.

FIG. 2 is a top view of a rail 200, for supporting pallet carts, in accordance with a preferred embodiment of the invention. A side view of rail 200 is shown in FIG. 3. Rail 200 has a cross-sectional shape of an I-beam. Rail 200 includes a top (upper) wall 210, a bottom (lower) wall 220 and a vertical wall 230 extending from top wall 210 to bottom wall 220. Lower wall 220 can be at a right angle to vertical wall 230, or at an angle or curve with respect to vertical wall 230, to help urge the wheels (discussed below) towards vertical wall 230.

Figure 4:
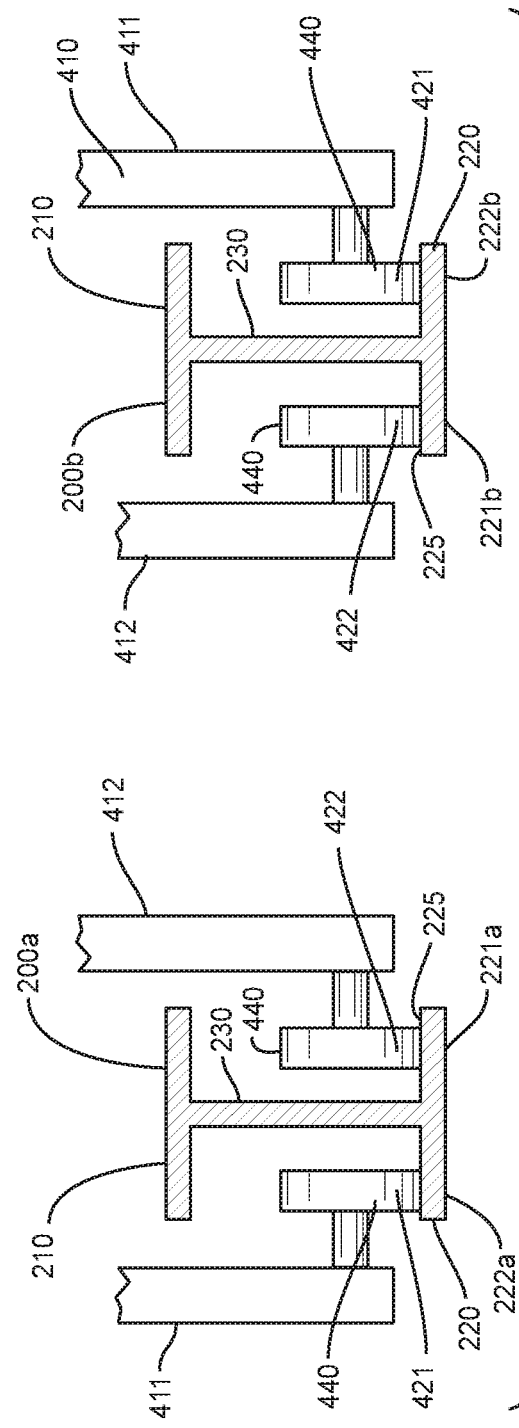
FIG. 4 is a front partial cross-sectional view of two rails and the front wheels of two carts in their forward position.

FIG. 4 depicts a pair of rails 200(*a* and *b*) of a rack 160, including a left rail 200*a* and a right rail 200*b*. Lower wall 220 of left rail 200*a* includes an inner flange 221*a* facing right rail 200*b* and an outer flange 222*a* facing away from right rail 200*b*. Lower wall 220 of right rail 200*b* includes an inner flange 221*b* facing rail 200*a* and an outer flange 222*b* facing away from rail 200*a*. Lower wall 220 includes a top surface 225, on which a set of wheels 440 ride. Each cart includes four legs. These legs can include an outer leg 411 supporting an inwardly facing outer wheel 421 and an inner leg 412, supporting an outwardly facing inner wheel 422. The wheels can be flat, in the case of a flat lower horizontal wall, or beveled or inclined in the case of inclined or curved lower walls, to ride flat on the upper surface of the lower horizontal wall.

Referring to FIGS. 2 and 3, horizontal upper wall 210 of rail 200 includes a pair of inner and outer cut-out notches (slots) 215 on both right rail 200*a* and left rail 200*b*. Notches 215 are sized to receive wheels 440 and legs 411 or 412, as pallet supporting carts are installed on rails 200. In FIG. 2, notches 215 are shown on opposite sides of vertical wall 230. However, they can be offset from each other as desired.

In a preferred embodiment of the invention, rails 200 are inclined, with the rear higher than the front, such that the carts roll, on their own, toward the front of each rack. However, it is desirable to provide a flat surface for supporting the pallets. Therefore, it is preferred to adjust the length of the cart legs so that the top surface of the cart is flat. With upwardly inclining rails, the front legs should be longer than the rear legs, so that the distance from the upper surface of the carts to the wheels of the front legs is longer than with the rear legs, to provide a flat surface, based on the pitch of the rails and the spacing of the front and rear legs. Thus, the pitch, times the wheel spacing equals the height difference between the front and rear legs.

Figure 5:
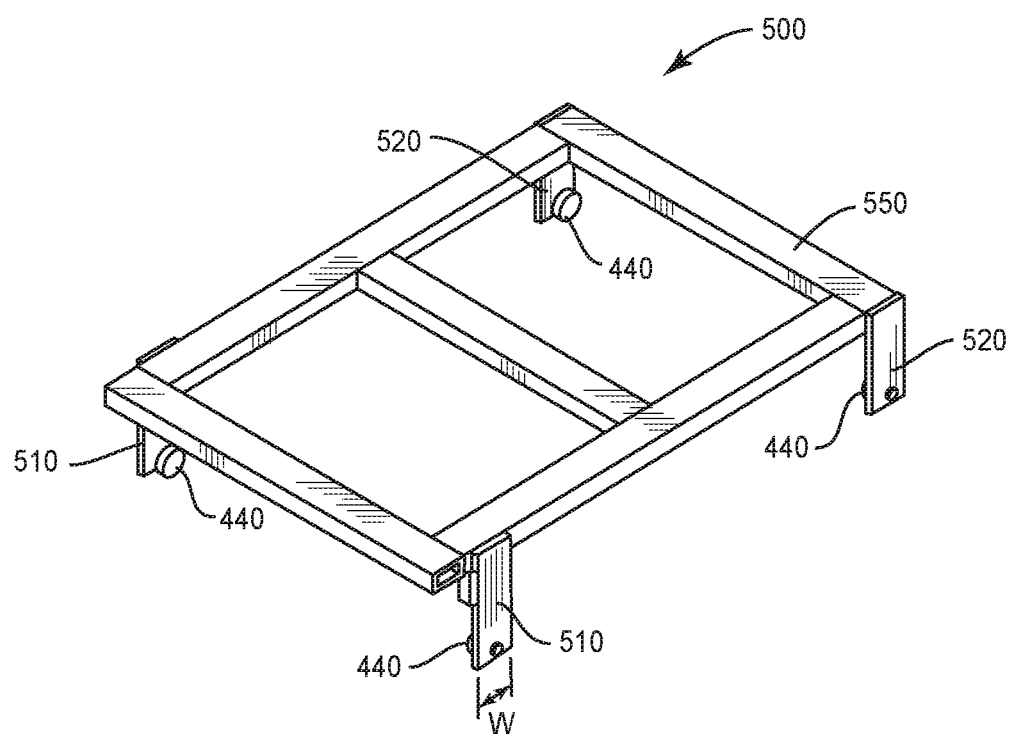
FIG. 5 is a perspective view of a pallet cart in accordance with an embodiment of the invention.

A cart 500, having wheels 440 facing inwardly, and designed to ride on the outer flange of lower horizontal wall 220, is shown in perspective view in FIG. 5. Cart 500 includes a pallet support portion with a support surface 550, two front legs 510 and two rear legs 520. Front legs 510 have a width W. Based on the pitch and the leg spacing, those skilled in the art will be able to calculate the height difference, so that pallet support surface 550 can be flat. For example, if the pitch is $5/16$ inch per foot and the legs are spaced 3 feet apart, front legs 510 should be $15/16$ inch longer than rear legs 520. Cart 500, with all wheels on the outside of the cart beam and facing inward, is appropriate for the last cart of the set, for example, cart 173*a*, which rides over all the carts.

Figure 6:
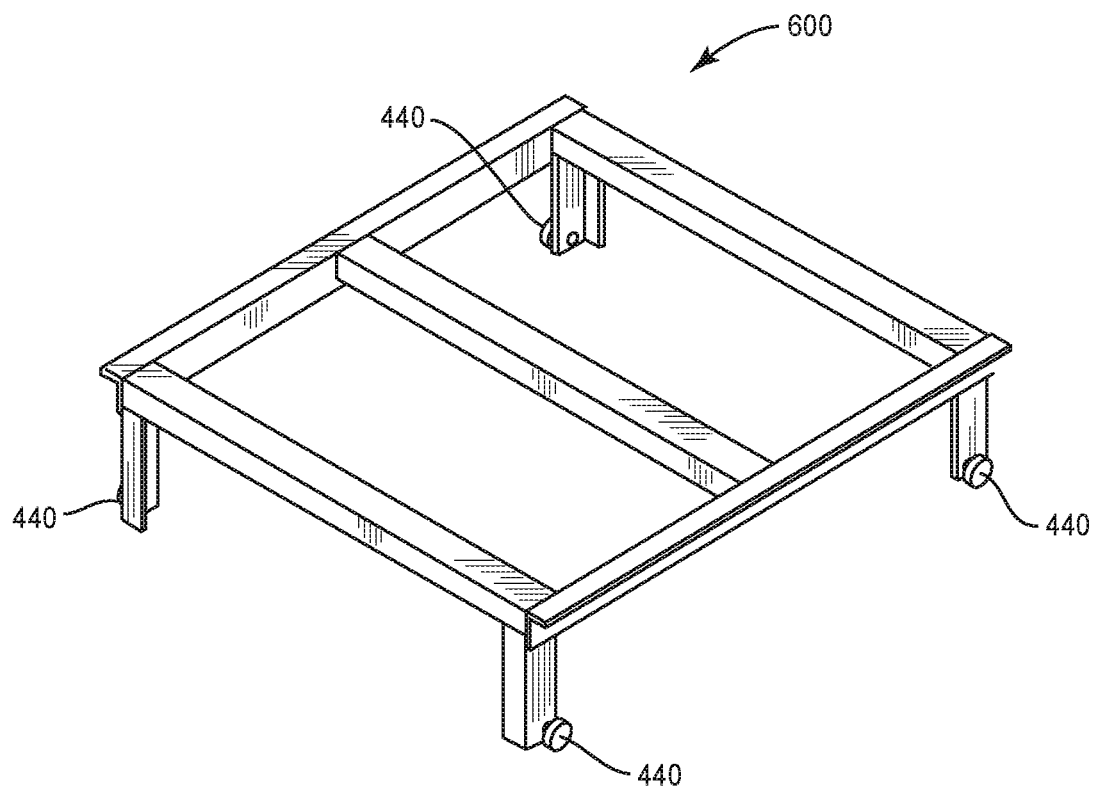
FIG. 6 is a perspective view of another pallet cart in accordance with another embodiment of the invention.
Figure 7:
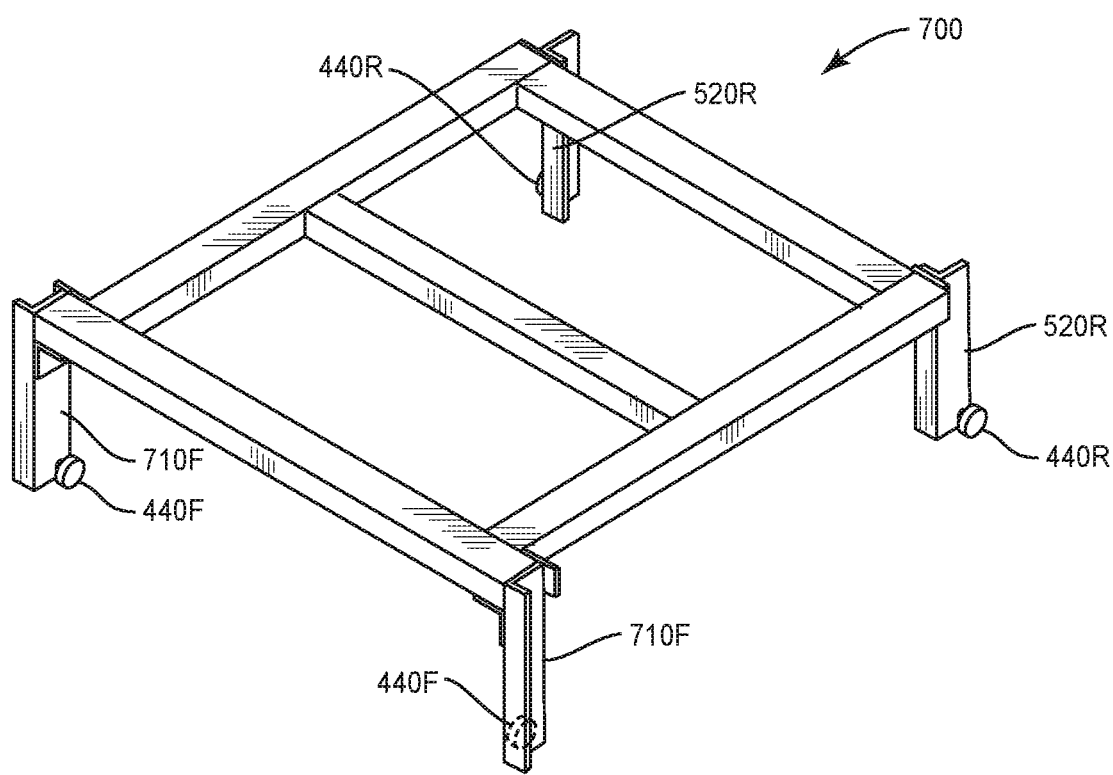
FIG. 7 is a perspective view of another pallet cart in accordance with another embodiment of the invention.

A cart 600, having all wheels 440 facing outward, and designed to ride on the inner flange of lower horizontal wall 220, is shown in perspective view in FIG. 6. Cart 600 is intended to be the front-most lowest cart in the set, for example, cart 171*a*. Note that if legs 520 are high enough to provide sufficient clearance, cart 500 can slide completely over cart 600.

A cart 700, wherein left and right rear wheels 440R face outward and left and right front wheels 440F face inward is suitable for a cart in any position, but most appropriate for an intermediate cart, such as cart 171*b*. Thus, front legs 710 F can ride over outwardly facing rear wheels of a front cart and rear legs 520 are can be overlapped by the inwardly facing front legs of a more rearward cart.

Rack systems in accordance with the invention also provide manufacturing advantages, compared to prior systems. For example, every rail can be identical. There is no need to manufacture both notched and un-notched rails. In addition, by spacing the front legs of the rearward carts further back at their point of attachment to the carts, based on the width of the front legs of the more forward carts, all of the carts can align flush in a forward condition. For example, if the legs of the carts are 4 inches wide, offsetting the front legs of the second cart back 4 inches from the leg location of a front cart will cause the front of both carts to align, in the forward, unloaded, nested condition.

In one preferred embodiment of the invention, the left and right rails are about 35-36 inches apart; the inwardly facing wheels are about 38-39 inches apart and the outwardly facing wheels are about 32-33 inches apart. The front and rear wheels can be spaced about 36-42 inches apart and depending on the thickness of the cart, the legs can be about 3 to 12 inches in length. Generally, the front leg will be about an inch longer than the rear leg, depending on pitch.

Rack systems in accordance with the invention are generally constructed as multi-level bays, with generally two or more levels. Three, four and even higher systems are common. The bays extend back from a front end to a rear end and have left and right rails, when viewed from the perspective of a viewer looking from the front end, towards the rear of the bay.

A standard pallet is about 4 feet long and about 3.5 feet wide and can often support 3000 lb or more of goods. Hence, a three-pallet deep bay should be at least 12 feet long. Extra space is typically provided, as goods can extend past the sides of a pallet and extra room can be needed for a variety of reasons. For example, a 5-pallet deep bay can have rails that are 250 inches (20'10") long.

The rails can be formed with S-3×5.7# I-beams. Other sizes can also be used, depending on the application. The slots for the wheels to fit through the top flange of the rails can be set about 1 to 3 feet from the front of the rails, preferably 18 to 24 inches. The slots should be about 2 to 4 inches wide, preferably 2.5 to 3.5 inches wide. It will be apparent that the size of the slots should be larger than the diameter of the cart wheels and leg width.

Systems in accordance with the invention can be adapted to store pallet loads of seven or more pallets deep. This system comprises a framework providing a plurality of storage bays, each of which is defined by a plurality of uprights and horizontal shelf beams constructed and arranged in a generally conventional arrangement, such as, for example, the storage racks manufactured by Frazier Industrial Company. The framework is shown only partially in the drawings but is shown in more detail in U.S. Pat. Nos. 4,494,852 and 4,955,489, incorporated by reference.

Each of the storage bays can be constructed of a width to accommodate two rows of pallets. The racks are formed with a plurality of vertically extending upright frames, each of which comprises vertical columns, horizontally extending ties and, where needed, crossbrace members. Such a frame structure is conventional in the art. Each upright frame on the right side (from the perspective of a viewer looking into the bay) of the storage bay is connected to a corresponding upright frame on the left side of a storage bay by a plurality of horizontal shelf beams, including a front shelf beam, interior shelf beams and a rear shelf beam. The interior shelf beams can be connected by bolts and connectors. This connection design is conventional. The arrangement of the upright frames and horizontal shelf beams provides support for the pallets containing the stored loads and supports the tracks and carts for positioning the pallet loads in the storage bays. Each storage bay can be of a size to contain two rows of pallets each seven or more deep. Other depths of two, three, four, five, six or more pallets are acceptable.

For each row of pallets, there is provided a pair of tracks extending along the depth of the storage bay. The tracks are adapted to support a set of carts for movement along said track from forward positions to rear positions. Six carts are used for a seven-pallet deep bay. The front pallet rests on the cart rails, not on a cart. Thus, a seven-pallet deep bay includes six carts. The track and the associated set of carts, in effect, provide a seven deep storage system.

The track system comprises a corresponding pair of rails having an I-shaped cross-section, similar to an I-beam. Each of said I-shaped structural members can be bolted to a front shelf beam by angle brackets, for example and is supported on interior shelf beams.

The carts comprise a set of carts constructed and arranged to ride on the track as discussed above. The carts can comprise a rectangular frame formed of a plurality of structural members welded or bolted together. Legs can be bolted or welded to the frame to provide a downwardly extending leg portion for supporting the wheel assemblies of the carts.

There are provided two bearing-type wheel assemblies mounted on each side of the cart frame at the front and rear ends thereof to provide four rolling supports for each cart. The construction of the wheel assemblies will be described more fully hereafter. The wheel assemblies ride on the inwardly or outwardly facing bottom flange portions of the I-shaped structural members forming the tracks.

The wheel assemblies for the carts can have the same general construction and are mounted on vertically extending leg portions of the carts by conventional means and in a manner as described in detail in said prior mentioned patents. Briefly, the mounting can comprise horizontally extending holes punched in vertically extending legs of the wheel supporting brackets with each hole being used to mount a wheel assembly. Each of the wheel assemblies can have a horizontally extending axle having a threaded reduced diameter portion extending on a horizontal axis through the hole in the vertically extending supporting bracket. Typically, the reduced diameter portion of the axle extends through a pair of washers on the opposite sides of said vertically extending legs and is threadedly engaged with a nut in an arrangement whereby the axle is secured in place to extend on a horizontal axis. A wheel rim is rotatable supported on a hub of the axle by means of roller bearing means positioned between the hub and the wheel rim by conventional sealed roller bearing construction. The wheel rim for the wheel assemblies of the carts can be formed with a tapered outer or rolling surface, the taper angle being the same as the taper angle formed on the associated bottom flange portion of the structural members forming the tracks. The wheels typically have a diameter about 2-3 inches.

The carts are each mounted into the tracks on which they ride by the use of cut-out notches formed in the upper flanges of the both structural members forming said tracks. Briefly, the cut-out slots are located approximately the same distance from the front of the rails. Cut-out slots on the inner facing flange are for outwardly facing wheels and cut-outs on the outer facing flanges are for inner facing wheels. The rear wheels of the cart are placed on the top of the track and pushed forward until they are dropped through the cut-out slots into the installed position on the tracks. The cart is pushed back until the front wheels drop through the cut-outs.

Note that where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A rail for a storage rack system, comprising:
 a rail structure sufficiently strong enough and configured to support one side of a cart having two sets of wheels loaded with pallets of goods weighing 3000 pounds, the rail structure having a generally I-shaped cross section with a lower horizontal wall adapted to support the wheels of the cart supporting the load, a vertical wall extending up from the lower horizontal wall, and an upper horizontal wall at the top of the vertical wall, extending in a length direction;

the upper wall having a first flange extending in a first direction from the vertical wall and a second flange extending in a second direction, opposite the first direction, from the vertical wall, the first and second directions perpendicular to the length direction; and a first and a second cut-out notch through the first flange and the second flange, the first and second notches the same distance from a front end of the rail.

2. The rail of claim 1, wherein, the first and second notch are less than about 48 inches from the front end.

3. The rail of claim 1, wherein, the first and second notch are about 12 to 36 inches from the front end.

4. The rail of claim 1, wherein, the first and second notch are about 16 to 36 inches from the front end.

5. The rail of claim 1, wherein the notches about 2 to 4 inches long in the length direction.

6. The rail of claim 5, wherein the notches about 2 to 4 inches long in the length direction.

7. The rail of claim 5, wherein the first and second notches extend from the side edges of the upper wall, to, but not including, the vertical wall.

8. The rail of claim 1, wherein the notches are about 18 to 24 inches from the front of the rail.

9. The rail of claim 7, wherein the notches are about 18 to 24 inches from the front of the rail.

10. The rail of claim 7, wherein the notches are about 2 to 4 inches in the length direction and about 18 to 24 inches from the front of the rail.

11. The rail of claim 1, wherein the notches are about 21 inches from the front of the rail.

12. The rail of claim 9, wherein the notches are about 21 inches from the front of the rail.

13. The rail of claim 1, wherein the notches are symmetric.

14. The rail of claim 1, wherein the notches are about 2.5 to 3.5 inches long in the length direction.

15. The rail of claim 1, wherein the rail structure is formed from an S-3×5.7# I-beam.

* * * * *